United States Patent [19]

Anderson, III et al.

[11] Patent Number: 4,647,917

[45] Date of Patent: Mar. 3, 1987

[54] ARTICLE CONTROL SYSTEM HAVING CODED MAGNETOMECHANICAL MARKER

[75] Inventors: Philip M. Anderson, III, Chatham; Jeffrey C. Urbanski, Sparta, both of N.J.

[73] Assignee: Allied Corporation, Morris Township, Morris County, N.J.

[21] Appl. No.: 593,146

[22] Filed: Mar. 26, 1984

[51] Int. Cl.$^4$ .............................................. G08B 13/18
[52] U.S. Cl. ...................................... 340/572; 340/551
[58] Field of Search ................................. 340/572, 551

[56] References Cited

U.S. PATENT DOCUMENTS

| | | | |
|---|---|---|---|
| 3,557,758 | 1/1971 | Lack | 340/572 |
| 3,832,530 | 8/1974 | Reitboeck et al. | 340/551 |
| 3,919,704 | 11/1975 | Williams et al. | 340/572 |
| 4,300,183 | 11/1981 | Richardson | 340/572 |
| 4,394,645 | 7/1983 | Humble et al. | 340/551 |
| 4,510,490 | 4/1985 | Anderson, III et al. | 340/572 |

*Primary Examiner*—Glen R. Swann, III
*Attorney, Agent, or Firm*—Ernest D. Buff; Gerhard H. Fuchs

[57] ABSTRACT

An article control system has an encoded marker associated with an article appointed for passage through an interrogation zone. The marker resonates upon interrogation to provide a signal which is detected and compared against a code list containing at least one predefined code. A signal generated upon verification of parity between marker resonance and the predefined code triggers an alarm or actuates a gating mechanism adapted to redirect the article.

20 Claims, 6 Drawing Figures

ARTICLE CONTROL SYSTEM HAVING CODED MAGNETOMECHANICAL MARKER

BACKGROUND OF THE INVENTION

1. Field of the Invention

The invention relates to an article control system and an encoded marker used therein, and more particularly, to a system in which an article of luggage having an encoded marker attached thereto is monitored from a remote location and thus guided to a proper destination.

2. Description of the Prior Art

Article control systems, upon which this invention has improved, are conventionally employed in applications where articles of luggage are required to be transferred to many different locations. There presently exists two main categories of such systems: manual and automated.

Manual article control systems entail affixing a label containing a destination code and/or address directly to an article and thereafter visually reading the affixed label to determine the proper routing required to allow the article to reach its proper destination. Such systems are personnel dependent, thus in applications where large volumes of articles are transferred to many different locations human error or misreading of labels becomes increasingly detrimental to the efficiency of the system. Also, visually reading the affixed label requires correct positioning and the proper lighting of the article.

Existing automated article control systems entail affixing a color coded tag or bar code to an article, such tags or bar codes contain inscripted information about the article such as a name, address or destination. An article to which a tag or bar code is affixed upon passing by a visual scanner conveys its inscripted information to a signal generating device enabling a routing mechanism to guide the article to its proper destination. The major drawbacks of these tags or codes is that they require proper orientation of the color coded tag or bar code to the visual scanner and any obstruction between the tag or code and the scanner disables the system. As a result of this such automated article control system are less efficient and reliable than expected.

SUMMARY OF THE INVENTION

The present invention provides an article control system that allows an article to which an encoded marker is attached to be remotely monitored and/or guided to a proper destination. The coded marker remains functional regardless of the orientation of the article to which it is attached and, more surprisingly, the marker requires no power or physical contact with the system's sensing devices.

Generally stated, the article control system of the invention comprises means for defining an interrogation zone. The system has a generating means, including an interrogating coil, for generating a magnetic field having a frequency band within the interrogation zone and a marker associated with an article appointed for passage through the interrogation zone. The marker is responsive within the interrogation zone to undergo a substantial change in its effective magnetic permeability at preselected frequencies within the frequency band that provides the marker with signal identity. The marker comprises at least one strip of magnetostrictive, ferromagnetic material. The strip is adapted to be magnetically biased and thereby armed to resonate mechanically at a preselected frequency with the frequency band of the magnetic field. The system has a detecting means for detecting the resonance of the marker within the interrogation zone. A cataloging means is provided for maintaining a code list comprising at least one predefined code, which is generated by a code entry means.

The system also includes a decoding means for comparing the detected marker resonance against the code list to verify parity between said resonance and said predefined code. Finally the system entails a signal means for generating a signal in response to an indication of parity from the decoding means In addition to monitoring articles and/or guiding articles to a proper destination, the article control system of the invention provides added security against theft and/or accidental loss of articles as a benefit of having a remotely detected marker whose code is not externally visible.

BRIEF DESCRIPTION OF THE DRAWINGS

The invention will be more fully understood and further advantages will become apparent when reference is made to the following detailed description of the preferred embodiment of the accompanying drawings in which.

DESCRIPTION OF THE PREFERRED EMBODIMENTS

The components of the article control system 10 can be fabricated in a number of diverse sizes and configurations. As a consequence, the invention has been found to function with many varieties of article control systems. For illustrative purposes, the invention is described in connection with an article control system in which the monitored and/or guided articles are items of luggage passing through an airport to which coded markers have been attached allowing more efficient and reliable transferring of such items to their proper destinations. It will be readily appreciated that the invention can be employed for similar and yet diversified uses, such as the identification of articles, wherein the marker and the system exchange magnetomechanical energy so that the marker functions as an identifier for checkpoint control of classified documents, warehouse packages, library books and the like. Accordingly, the invention is intended to encompass modifications of the preferred embodiment wherein at least one resonant frequency of the marker provides articles bearing it with signal identity.

Figure 1:
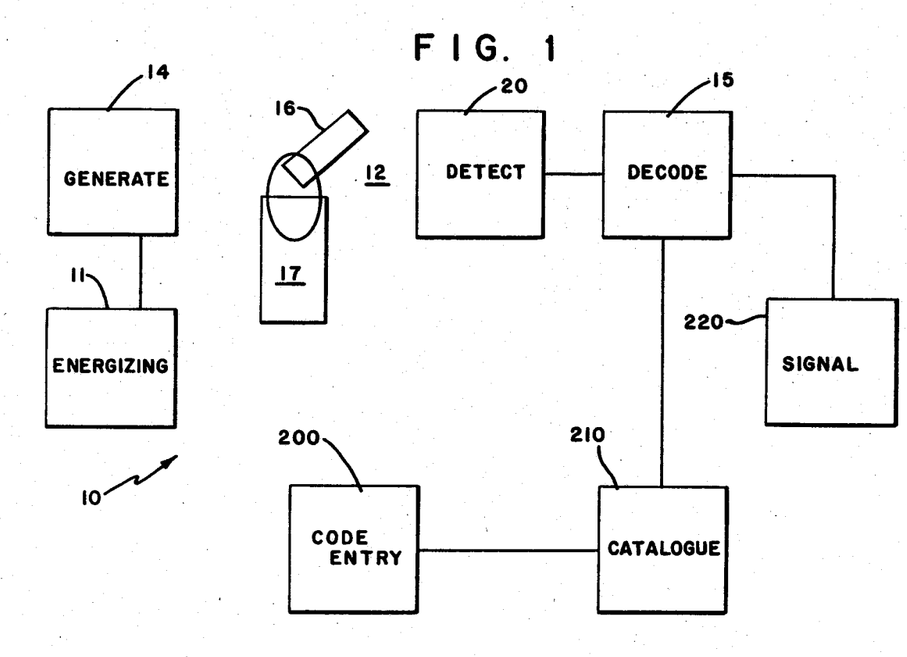
FIG. 1 is a block diagram of an article surveillance system incorporating the present invention.

Referring to FIG. 1 of the drawings, there is shown an article control system 10 responsive to the presence of an article within an interrogation zone. The system 10 has means for defining an interrogation zone 12. A field generating means 14 is provided for generating a magnetic field having a frequency band within the interrogation zone 12. The system 10 provides a marker 16 associated with an article 17 which is responsive within the interrogation zone 12 to undergo a substantial change in its effective magnetic permeability at preselected frequencies within the frequency band that provides the marker 16 with signal identity. A detecting means 20 is also provided for detecting resonance of said marker within the interrogation zone 12. A cataloging means 210 is provided for maintaining a code list comprising at least one predefined code which is generated by a code entry means 200. The system 10 also includes a decoding means 15 for comparing the detected marker resonances against the code list to verify parity between said resonances and said predefined code. Finally, the system entails a signal means 220 for generating a signal in response to an indication of parity from the deoding means 15.

Figure 2:
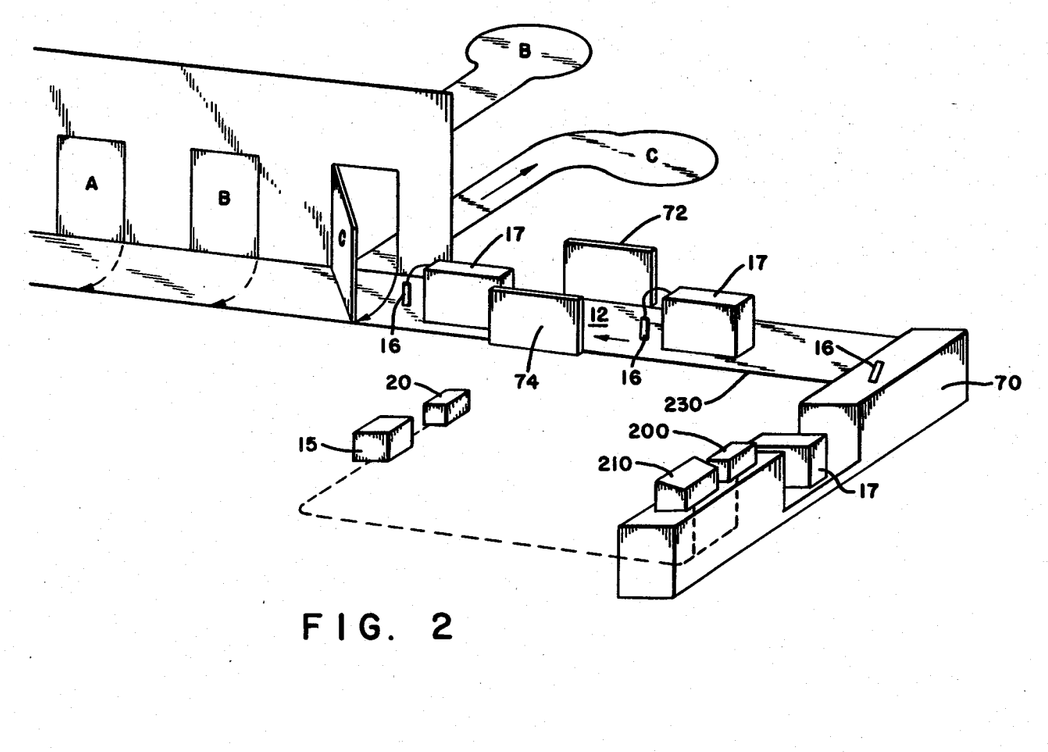
FIG. 2 is a diagrammatic illustration of a typical installation of the system of FIG. 1.

FIG. 2 of the drawings is a diagrammatic illustration of an article control system installed in an airport where incoming articles 17 labeled luggage from passengers must be monitored and/or guided to the proper airplane whose destination matches that of the passenger. A passenger and luggage 17 arrive at an airport and proceed to the reservation desk 70. The reservation desk 70 is that local at which the passenger's flight reservations are confirmed and the luggage 17 is prepared for transit to the airplane's luggage compartment. Upon verification of the passenger's reservations a marker 16 is attached to the luggage 17. The code of marker 16 is then entered via code entry means 200 to the cataloging means 210, which correlates the entered code with the passenger's name and destination. The luggage 17 with attached marker 16 is then placed on conveyor 230, which transports luggage 17 towards the airplane cargo loading area. As shown in FIG. 2, the main conveyor belt 230 proceeds past three gates A, B and C which are connected to individual conveyor belts A (not shown), B and C, each of which leads to a different airplane cargo loading area A (not shown), B or C. The generating means 14, interrogating coil 72 and a receiving coil 74 of the detecting means 20 are located on opposite sides of the conveyor belt 230 providing an interrogation zone 12 located prior to the first gate C. The marker 16 upon entering the interrogation zone 12 is characterized by a substantial change in its effective magnetic permeability at the resonant and/or antiresonant frequency (shown in FIG. 3 as fr and fa) of which each of the predefined frequencies are comprised that provides marker 16 with signal identity. The detecting means 20 then detects the resonant frequencies at which the marker 16 undergoes the substantial change in effective magnetic permeability. These frequencies are then relayed to the decoding means 15 which compares the detected marker 16 resonances against a code list relayed from the cataloging means 210 and upon finding a predefined code that matches the marker's 16 resonances, the decoding means 20 relays a corresponding code from the code list to the signal means 220 (FIG. 1). The signal means 220 is a series of three gates A, B and C, each of which responds by opening to a different code relayed from the decoding means 15. Thus, the luggage 17, upon passing through the interrogation zone 12, is guided through one of the gates A, B and C which corresponds to the marker 16 code. Once the luggage 17 is through the correct gate, the gate closes allowing the signal means 220 to respond to the next code received from the decoding means 15. The luggage 17, upon being guided through the correct gate, proceeds down a corresponding conveyor A, B or C towards a corresponding airplane cargo loading area A, B or C.

The marker 16 (FIG. 4) is comprised of at least one strip 18 of amorphous magnetostrictive ferromagnetic material enclosed within a container 19 composed of a ferromagnetic filled plastic such as polyester filled with barium ferrite. Container 19 consists of two parts: a boat 62 and a cover 44. The container must be constructed in such a manner that strip 18 remains undamped or free to vibrate, upon being placed in the boat 62 and enclosed by the cover 44. This can be accomplished by leaving 1 millimeter clearance on all inside dimensions of container 19. The container 19 is adapted, upon being magnetized, to magnetically bias the strip 18 and thereby arm the strip 18 to resonate at its preselected frequency. The marker is composed of a magnetostrictive amorphous metal alloy in the form a strip 18 having a first component composed of a composition consisting essentially of the formula $M_aN_bO_cX_dY_eZ_f$, where M is at least one of iron and cobalt, N is nickel, O is at least one of chromium and molybdenum, X is at least one of boron and phosphorous, Y is silicon, Z is carbon, "a'-'-"f" are in atom percent, "a" ranges from about 35-85, "b" ranges from about 0-45, "c" ranges from about 0-7, "d" ranges from about 5-22, "e" ranges from about 0-15 and "f" ranges from about 0-2, and the sum of d+e+f ranges from about 15-25. The marker 16 is designed in such a manner as to allow numerous codes to be represented. Coded markers having the structure of marker 16 are visually indistinguishable from one another improving the system's theft protection characteristics.

The code entry means 200 for generating a code list can be actuated by several different methods. One method consists of a keyboard wherein the code is visually read from markings on the marker 16 and then entered by pressing corresponding buttons on the keyboard in the correct sequence. Alternatively the marker's 16 code may be entered by voice demodulation in which markings on the marker 16 are transposed to verbal communication and then demodulated to an electronic representation. Also an electronic signal such as that created by detecting the resonances of marker 16 or by communication via a modem can be used to enter the markers code.

The cataloging means 210 for maintaining a code list, correlates the code of marker 16 to information on the luggage 17 to which it is attached such as destination code, identification codes and/or routing codes. The cataloging means 210 receives the markers 16 code from the code entry means 200 and upon verification of the passengers reservations the additional information codes are received via an electronic terminal. Upon request the cataloging means 210 transmits the code list to the decoding means 15 via an electronic signal.

The decoding means 15 searches the code list, from the cataloging means 210, for a code that matches the detected marker's 16 code, from the detecting means 20. Upon finding a matching pair of codes the decoding means 15 transmits a corresponding code such as a destination code to the signal means 220. The signal means 220 then produces a physical response which is individually keyed to the received code such as opening a specific gate and/or lighting corresponding lights.

The generating means 14 is comprised of an energizing circuit 201 (FIG. 6) and an interrogation coil 206. The energizing circuit 201 in the preferred embodiment is adapted to provide the interrogating coil 206 with a burst of sine wave frequencies that includes each the marker's preselected frequencies. There are several other possible energizing means which provide the marker 16 with each of its preselected frequencies, including (1) a frequency sweeping means adapted to sweep through each different preselected frequency of the marker 16, (2) an energizing means adapted to provide the interrogating coil 206 with a pulse, the width of which is equal to 1/(2 fr), where fr is the preselected frequency (3) an energizing means adapted to provide the interrogating coil 206 with a burst of noise and (4) an energizing means adapted to provide the interrogation coil 206 with a burst of sweeping sine wave frequency.

Figure 6:
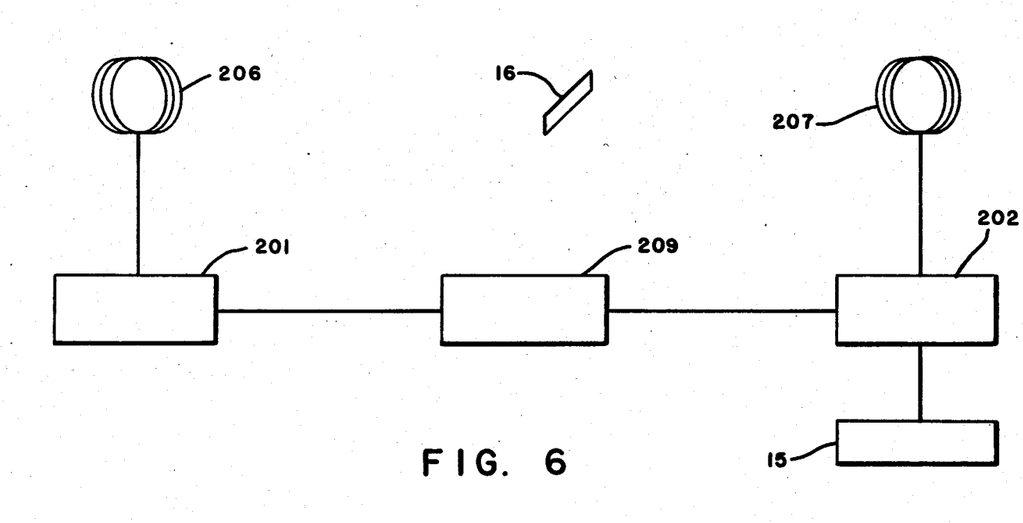
FIG. 6 is a schematic electrical diagram of an interrogation and detection scheme comprising part of the article control system of FIG. 1.

In operation, the generating means 14 provides a burst of sine wave frequencies. Upon completion of the burst the marker 16 will continue to vibrate and thereby undergo damped oscillation at its resonance frequencies. The vibrating marker 16 will cause a voltage to be induced in the receiving coil 207 of the detection means 20 at each of the resonant frequencies. The detecting means 20 is synchronized with the generating means 14 via synchronizing circuit 209 in such a manner as to allow the resonant frequencies induced in the receiving coil 207 to be detected only after completion of the interrogating burst. The detecting means 20 determines the values, via the detecting circuit 202, of the resonant frequencies of the marker 16 and thus produces a frequency code. The frequency code is transmitted to the decoding means 15 for comparison with the code list.

Figures 4, 5:
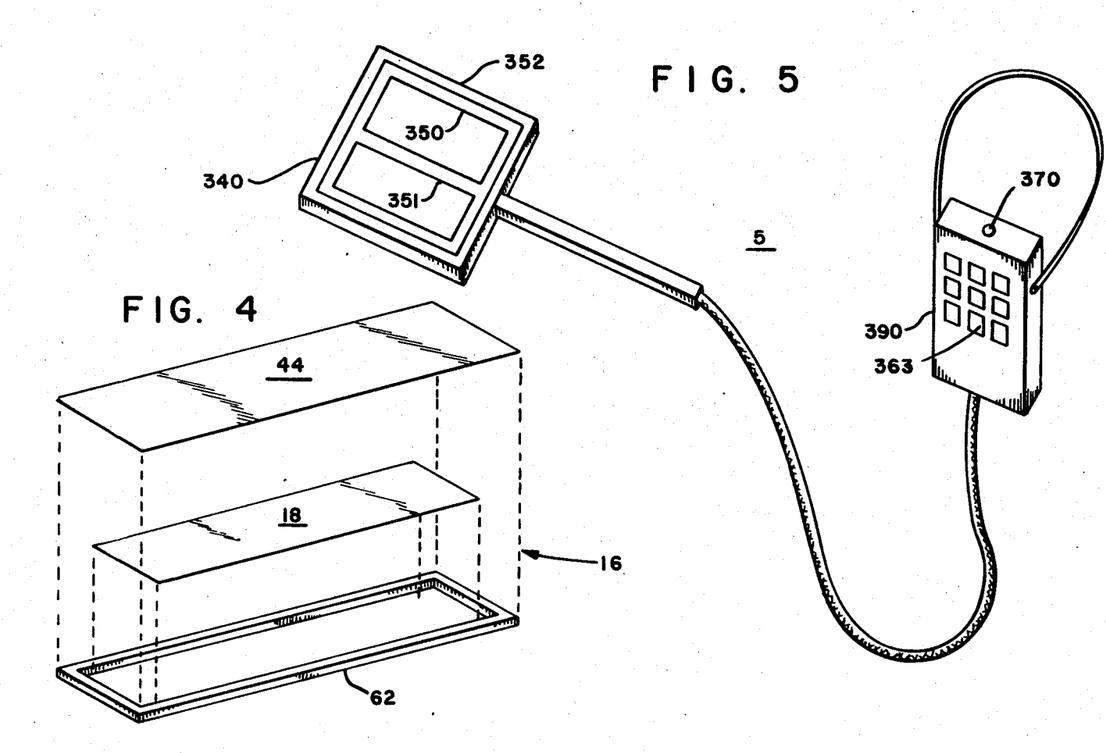
FIG. 4 is a isometric view showing components of a marker adapted for use in the system of FIG. 1.
FIG. 5 is an isometric view showing a portable unit of the system of FIG. 1.

In another aspect of the invention, the article control system 5 in FIG. 5 is designed as a portable unit capable of locating a specific item of luggage located in the presence of many other items of luggage. The method of operation is the same as previously described, however, the configuration is slightly altered. The antenna system 340 of FIG. 5 is constructed as a hand held unit consisting of a pair of interrogation coils 350, 351 disposed adjacent and coplanar to each other and driven alternately at phase angles of 0° and 180° with respect to each other. A receiving coil 352 is positioned coplanar and centered about the interrogation coils 350, 351. The complete antenna system 340 is encased within a nonmagnetic binder with an attached handle through which linking means with the electronics of system 5 are placed. The electronics of system 5 are located within a portable box which enables the code of the specific luggage to be entered via a keypad 363 thereon. Upon positioning the antenna system 340 in the vicinity of the specific luggage a signal is produced such as a flashing light, 370. Thus system 5 enables a desired item of luggage with affixed marker to be located efficiently and quickly.

It has been found that markers 16 containing strips 18, or magnetostrictive amorphous material are particularly adapted to resonate mechanically at preselected frequencies of an incident magnetic field. While we do to wish to be bound by any theory, it is believed that, in markers of the aforesaid composition, direct magnetic coupling between an ac magnetic field and the marker 16 occurs by means of the following mechanism.

When a ferromagnetic material such as an amorphous metal ribbon is in a magnetic field (H), the ribbon's magnetic domains are caused to grow and/or rotate. This domain movement allows magnetic energy to be stored, in addition to a small amount of energy which is lost as heat. When the field is removed, the domains return to their original orientation releasing the stored magnetic energy, again minus a small amount of energy lost as heat. Amorphous metal have high efficiency in this mode of energy storage. Since amorphus metals have no grain boundaries and have high resistivities, their energy losses are extraordinarily low.

When the ferromagnetic ribbon is magnetostrictive, an additional mode of energy storage is also possible. In the presence of a magnetic field, a magnetostrictive amorphous metal ribbon will have energy stored magnetically as described above but will also have energy stored mechanically via magnetostriction. This mechanical energy stored can be quantified as $U_e = (\frac{1}{2}) TS$ where T and S are the stress and strain on the ribbon. This additional mode of energy storage may be viewed as an increase in the effective magnetic permeability of the ribbon.

Figure 3:
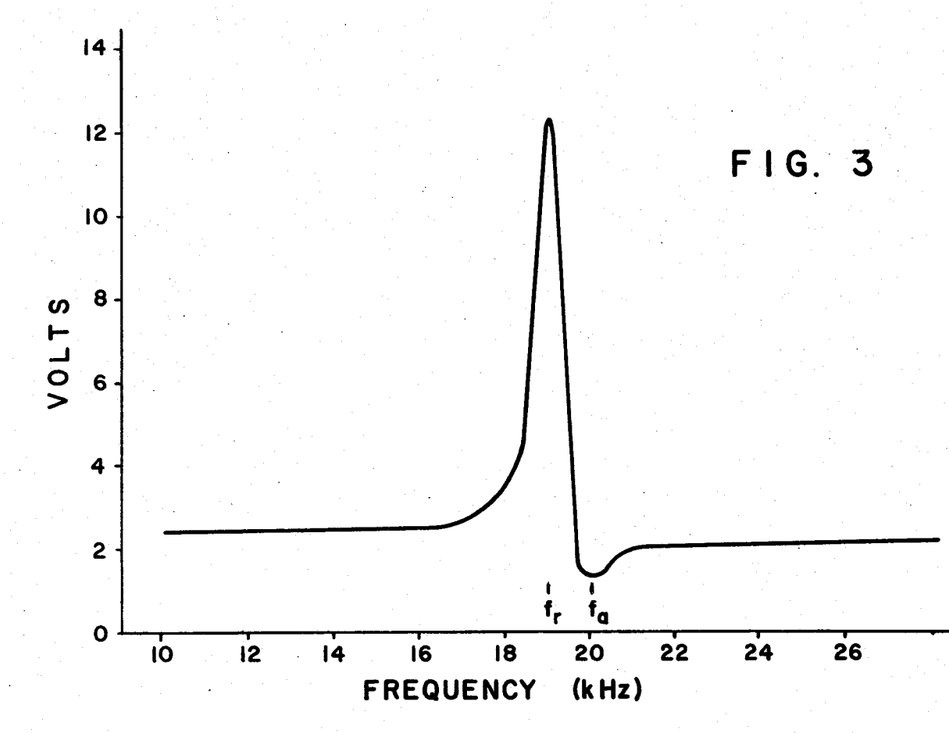
FIG. 3 is a graph showing the voltage induced by magnetomechanical energy exchange of an article control marker over a preselected frequency range.

When an ac magnetic field and a dc field are introduced on the magnetostrictive ribbon (such as can be generated by ac and dc electric currents in a solenoid), energy is alternately stored and released with the frequency of the ac field. The magnetostrictive energy storage and release are maximal at the material's mechanical resonance frequency and minimal at its antiresonance. This energy storage and release induces a voltage in a pickup coil via flux density changes in the ribbon. The flux density change may also be viewed as an increase in effective magnetic permeability at the resonant frequency and a decrease at antiresonance, thus, in effect, increasing or decreasing, respectively, the magnetic coupling between the driving solenoid and a second pickup solenoid. The voltage induced by the purely magnetic energy exchange is linear with frequency and the change in voltage with frequency is small over a limited frequency range. The voltage induced by the magnetomechanical energy exchange is also linear with frequency except near mechanical resonance. For a thin ribbon the mechanical resonance frequency is given by:

$$f_r = (n/2L)(E/D)^{\frac{1}{2}}$$

where L, E and D are the length, Youngs modulus and mass density of the ribbon and n indicates the order of the harmonic. Therefore, when the frequency of the ac magnetic field is swept around fr, a characteristic signature is generated. The resonance peak is closely followed by an anti-resonance peak shown in FIG. 3. This anti-resonant peak occurs when the mechanical energy stored is near zero.

The transfer of magnetic and mechanical energy described above is called magnetomechanical coupling (MMC), and can be seen in all magnetostrictive materials. The efficiency of this energy transfer is proportional to the square of the magnetomechanical coupling factor (k), and is defined as the ratio of mechanical to magnetic energy. Phenomenologically, k is defined as $$k = \sqrt{(1 - f_r^2/f_a^2)}$$

where fr and fa are, respectively, the resonant and antiresonant frequencies described above. The larger the k factor, the greater the voltage difference between resonant peak and anti-resonant valley. Also, the larger the k, the larger the difference in frequency between resonance and anti-resonance. Therefore, a large k facilitates the observation of the MMC phenomena.

Coupling factors are influenced in a given amorphous metal by the level of bias field present, the level of internal stress (or structural anisotropy) present and by the level and direction of any magnetic anisotropy. Annealing an amorphous metal relieves internal stresses, thus enhancing k. The structural anisotropy is small due to the ribbon's amorphous nature, also enhancing k. Annealing in a properly oriented magnetic field can significantly enhance coupling factors. Domain movement can be maximized when the ribbon has a magnetic anisotropy which is perpendicular to the interrogating field. Because of demagnetizing field effects, it is practical to interrogate the ribbon only along its length (this being the longest dimension). Therefore, the induced magnetic anisotropy should be transverse to the long dimension of the ribbon.

Maximum values of k are obtained by annealing the ribbon in a saturating magnetic field which is perpendicular to ribbon length (cross-field annealed). For a ½ inch ribbon, a field of a few hundred oersted is required. The optimum time and temperature of the anneal depends on the alloy employed. As an example, an iron-boron-silicon alloy yields an optimum coupling (k>0.90) when cross-field annealed at 400° C. for 30 minutes. This anneal yields an optimum bias field of 1 Oe. For alloys having the compositions specified hereinabove, the annealing temperature ranges from about 300° to 450° C. and the annealing time ranges from about 7 to 120 min.

The anneal also affects the bias field required to optimize k. For a given amorphous metal with a given anneal, the coupling depends strongly on the bias field. At zero and saturating fields, the coupling is zero (no resonant and anti-resonant phenomena). For a given alloy, an optimum bias field exists which yields a maximum k. For alloys having the compositions specified herein, the bias field required to optimize k ranges from about 0.1 to 20 Oe.

Even though most magnetostrictive materials will exhibit some MMC, amorphous metals yield extremely high coupling factors, and are, therefore highly preferred. As-cast amorphous metals yield higher k than most other magnetostrictive materials. No material has higher k than amorphous metals when cross-field annealed. Amorphous metals have high k because they have:

(a) low magnetic losses (no grain boundries, high resistivity), (b) low structural and stress anisotropy, (c) reasonable magnetostriction and (d) can be given a beneficial magnetic anisotropy.

Amorphous metal alloys make good markers because (a) they have high k—even as-cast, (b) they are mechanically strong, tough and ductile, (c) they require low bias fields and (d) they have extremely high magnetostrictivity (they develop a large force upon resonating and are, therefore, more difficult to damp out). It will be appreciated, therefore, that the amorphous metals of which the marker of this invention is composed need not be annealed, but may be incorporated into the marker "as cast".

Examples of amorphous ferromagnetic marker compositions in atomic percent within the scope of the invention are set forth percent within the scope of the invention are set forth below in Table 1.

TABLE 1

| ALLOY | AS-CAST k | OPTIMAL ANNEALED k |
|---|---|---|
| $Fe_{78}Si_9B_{13}$ | 0.35 | >0.90 |
| $Fe_{79}Si_5B_{16}$ | 0.31 | >0.90 |
| $Fe_{81}B_{13.5}Si_{3.5}C_2$ | 0.22 | >0.90 |
| $Fe_{67}Co_{18}B_{14}Si_1$ | 0.45 | 0.72 |
| $Fe_{40}Ni_{38}Mo_4B_{28}$ | 0.23 | 0.50 |

Examples of amorphous metals that have been found unsuitable for use as article surveillance system markers are set forth in Table 2.

TABLE 2

| | | COMPOSITION PERCENT | | | |
|---|---|---|---|---|---|
| | | EXAMPLE 1 | | EXAMPLE 2 | |
| Ni | at. % | 71.67 | Ni | at. % | 65.63 |
| | wt. % | 84.40 | | wt. % | 76.97 |
| Cr | at. % | 5.75 | Cr | at. % | 11.55 |
| | wt. % | 6 | | wt. % | 12.0 |
| B | at. % | 2.75 | B | wt. % | 11.58 |
| | wt. % | 2.75 | | wt. % | 2.5 |
| Si | at. % | 7.10 | Si | at. % | 7.13 |
| | wt. % | 4 | | wt. % | 4 |
| Fe | at. % | 2.23 | Fe | at. % | 3.14 |
| | wt. % | 2.5 | | wt. % | 3.5 |
| C | at. % | .25 | C | at. % | .12 |
| P | at. % | .032 | P | at. % | — |
| | wt. % | .02 | | wt. % | — |
| S | at. % | .031 | S | at. % | — |
| | wt. % | .02 | | wt. % | — |
| Al | at. % | .093 | Al | at. % | — |
| | wt. % | .05 | | wt. % | — |
| Ti | at. % | .052 | Ti | at. % | — |
| | wt. % | .05 | | wt. % | — |
| Zr | at. % | .027 | Zr | at. % | — |
| | wt. % | .05 | | wt. % | — |
| Co | at. % | .085 | Co | at. % | .85 |
| | wt. % | .1 | | wt. % | 1.0 |

The amorphous ferromagnetic metal marker of the invention is prepared by cooling a melt of the desired composition at a rate of at least about $10^5$° C./sec, employing metal alloy quenching techniques well-known to the amorphous metal alloy art; see, e.g., U.S. Pat. No. 3,856,513 to Chen et al. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be amorphous, in which case there is no long-range order. X-ray diffraction patterns of amorphous metal alloys show only a diffuse halo, similar to that observed for inorganic oxide glasses. Such amorphous alloys show only a diffuse halo, similar to that observed for inorganic oxide glasses. Such amorphous alloys must be at least 50% amorphous to be sufficiently ductile to permit subsequent handling, such as stamping complex marker shapes from ribbons of the alloys without degradation of the marker's signal identity. Preferably, the amorphous metal marker must be at least 80% amorphous to attain superior ductility.

The metastable phase may also be a solid solution of the constituent elements. In the case of the marker of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. An article control system, comprising:
   (a) a means for defining an interrogation zone;
   (b) generating means for generating within said interrogation zone a magnetic field having a predetermined frequency band, said generating means including an interrogating coil;
   (c) a marker associated with an article appointed for passage through said interrogation zone, said marker being responsive within said interrogation zone to undergo a substantial change in its effective magnetic permeability at preselected frequencies within said frequency band, which provides the marker with signal identity, said marker comprising at least one strip of magnetostrictive, ferromagnetic material that is at least 50 percent amorphous, said strip being adapted to be magnetically biased and thereby armed to resonate mechanically at a frequency within the frequency band of said magnetic field;
   (d) a detecting means for detecting resonance of said marker within said interrogation zone;
   (e) cataloging means for maintaining a code list comprising at least one predefined code;
   (f) code entry means for generating said code list;
   (g) decoding means for comparing said detected marker resonance against said code list to verify parity between said resonance and said predefined code; and
   (h) signal means for generating a signal in response to an indication of parity from said decoding means.

2. An article control system as recited in claim 1, wherein said signal is an audible or visible alarm.

3. An article control system as recited in claim 1, wherein said signal is an electronic signal and said system further comprises gating means for redirecting said article in response to said electronic signal.

4. An article control system as recited in claim 3 wherein said code list comprises a plurality of predefined codes, said decoding means comprises means for verifying parity between said resonance and one of said predefined codes, and said gating means comprises a plurality of gates, each of said gates being actuated by said signal means in response to parity with a different one of said predefined codes.

5. An article control system as recited in claim 1, wherein said code entry means is a electronic signal decoder.

6. An article control system, as recited in claim 1, wherein each of said generating and said detecting means includes at least one antenna coil.

7. An article control system as recited 6, wherein said antenna coils are disposed on opposing sides of said interrogation zone.

8. An article control system, as recited in claim 6, wherein said antenna coils of said generating and said detecting means are coplanar 9. An article control system as recited in claim 1, wherein said generating means comprises a pair of antenna coils disposed adjacent and coplanar to each other and driven by said generating means alternatively at phase angles of 0° and 180° with respect to each other.

10. An article control system as recited in claim 1, wherein said generating means includes frequency sweeping means adapted to sweep through each different preselected frequency of said markers.

11. An article control system as recited in claim 1, wherein said generating means includes energizing means adapted to provide said interrogating coil with a burst of sine wave frequencies that includes each said different preselected frequency.

12. An article control system as recited in claim 1, wherein said generating means includes energizing means adapted to provide said interrogating coil with a pulse, the width of which is equal to $1/(2\,f_r)$, where $f_r$ is the preselected frequency.

13. An article surveillance system as recited in claim 1, wherein said magnetostrictive ferromagnetic material of said marker is at least 80 percent amorphous.

14. An article control system, as recited in claim 1, wherein said magnetostrictive ferromagnetic material of said marker has a composition consisting essentially of the formula $M_a N_b O_c X_d Y_e Z_f$, where M is at least one of iron and cobalt, N is nickel, O is at least one of chromium and phosphorous, X is at least one of boron and phosphorous, Y is silicon, Z is carbon, "a"–"f" are in atom percent, "a" ranges from about 35–85, "b" ranges from about 0–45, "c" ranges from about 0–7, d ranges from about 5–22, "e" ranges from about 0–15, f ranges from about 0–2, and the sum of d+e+f ranges from about 15–25.

15. An article control system, comprising:
   (a) a means for defining an interrogation zone;
   (b) generating means for generating within said interrogation zone a magnetic field having a predetermined frequency band, said generating means including an interrogating coil and an energizing means adapted to provide said interrogating coil with a burst of noise;
   (c) a marker associated with an article appointed for passage through said interrogation zone, said marker being responsive within said interrogation zone to undergo a substantial change in its effective magnetic permeability at preselected frequencies within said frequency band, which prevides the marker with signal identity, said marker comprising at least one strip of magnetostrictive, ferromagnetic material, said strip being adapted to be magnetically biased and thereby armed to resonate mechanically at a frequency within the frequency band of said magnetic field;
   (d) a detecting means for detecting resonance of said marker within said interrogation zone;
   (e) cataloging means for maintaining a code list comprising at least one predefined code;
   (f) code entry means for generating said code list;
   (g) decoding means for comparing said detected marker resonance against code list to verify parity between said resonance and said predefined code; and
   (h) signal means for generating a signal in response to an indication of parity from said decoding means.

16. An article control system, comprising:
(a) a means for defining an interrogation zone;
(b) generating means for generating within said interrogation zone a magnetic field having a predetermined frequency band, said generating means including an interrogating coil and an energizing means adapted to provide said interrogating coil with a burst of sine wave frequency;
(c) a marker associated with an article appointed for passage through said interrogation zone, said marker being responsive within said interrogation zone to undergo a substantial change in its effective magnetic permeability at preselected frequencies within said frequency band, which provides the marker with signal identity, said marker comprising at least one strip of magnetostrictive, ferromagnetic material, said strip being adapted to be magnetically biased and thereby armed to resonate mechanically at a frequency within the frequency band of said magnetic field;
(d) a detecting means for detecting resonance of said marker within said interrogation zone;
(e) cataloging means for maintaining a code list comprising at least one predefined code;
(f) code entry means for generating said code list;
(g) decoding means for comparing said detected marker resonance against said code list to verify partiy between said resonance and said predefined code; and
(h) signal means for generating a signal in response to an indication of parity from said decoding means.

17. An article control system, comprising:
(a) a means for defining an interrogation zone;
(b) generating means for generating within said interrogation zone a magnetic field having a predetermined frequency band, said generating means including an interrogating coil and an energizing means for providing said interrogating coil with an energizing signal;
(c) a marker associated with an article appointed for passage through said interrogation zone, said marker being responsive within said interrogation zone to undergo a substantial change in its effective magnetic permeability at preselected frequencies within said frequency band, which provides the marker with signal identity, said marker comprising at least one strip of magnetostrictive, ferromagnetic material, said strip being adapted to be magnetically biased and thereby armed to resonate mechanically at a frequency within the frequency band of said magnetic field;
(d) a detecting means for detecting resonance of said marker with said interrogation zone, said detecting means including receiving means for distinguishing a resonant frequency for each of said markers detected by said receiving coil from other frequencies induced therein;
(e) synchronizing means associated with said energizing means for sequentially activating and deactivating each of said energizing means and receiving means;
(f) cataloging means for maintaining a code list comprising at least one predefined code;
(g) code entry means for generating said code list;
(h) decoding means for comparing said detected marker resonance against said code list to verify parity between said resonance and said predefined code; and
(i) signal means for generating a signal in response to an indication of parity from said decoding means.

18. An article control system as recited in claim 17, wherein said synchronizing means is adapted to prevent activation of said receiving means for substantially the entire period of time that said energizing means is activated.

19. An article control system as recited in claim 17, wherein said synchronizing means is adapted to prevent activation of said energizing means for substantially the entire period of time that said receiving means is activated.

20. An article control system, comprising:
(a) a means for defining an interrogation zone;
(b) generating means for generating within said interrogation zone a magnetic field having a predetermined frequency band, said generating means including an interrogating coil;
(c) a marker associated with an article appointed for passage through said interrogation zone, said marker being responsive within said interrogation zone to undergo a substantial change in its effective magnetic permeability at preselected frequencies within said frequency band, which provides the marker with signal identity, said marker comprising at least one strip of magnetostrictive, ferromagnetic material, said strip being adapted to be magnetically biased and thereby armed to resonate mechanically at a frequency within the frequency band of said magnetic field, and said marker being comprised of a ferromagnetic filled plastic in the form of a container consisting of two parts: a boat and cover, which upon being magnetized is adapted to provide said strips with a magnetic bias field;
(d) a detecting means for detecting resonance of said marker within said interrogation zone;
(e) cataloging means for maintaining a code list comprising at least one predefined code;
(f) code entry means for generating said code list;
(g) decoding means for comparing said detected marker resonance against said code list to verify parity between said resonance and said predefined code; and
(h) signal means for generating a signal in response to an indication of parity from said decoding means.

* * * * *